United States Patent
Mueller et al.

(10) Patent No.: US 10,532,348 B2
(45) Date of Patent: Jan. 14, 2020

(54) HYDROGEN OXIDATION CATALYST, USE THEREOF, AND METHOD FOR HYDROGEN RECOMBINATION

(71) Applicant: CLARIANT PRODUKTE (DEUTSCHLAND) GMBH, Frankfurt am Main (DE)

(72) Inventors: Patrick Mueller, Prien am Chiemsee (DE); Arno Tissler, Tegernheim (DE); Frank Klose, Rosenheim (DE); RoderikPeter Althoff, Rosenheim (DE); Olaf Buettner, Kolbermoor (DE)

(73) Assignee: CLARIANT PRODUKTE (DEUTSCHLAND) GMBH (DE)

( * ) Notice: Subject to any disclaimer, the term of this patent is extended or adjusted under 35 U.S.C. 154(b) by 471 days.

(21) Appl. No.: 14/389,857

(22) PCT Filed: Apr. 2, 2013

(86) PCT No.: PCT/EP2013/056943
§ 371 (c)(1),
(2) Date: Oct. 1, 2014

(87) PCT Pub. No.: WO2013/150030
PCT Pub. Date: Oct. 10, 2013

(65) Prior Publication Data
US 2015/0064102 A1 Mar. 5, 2015

(30) Foreign Application Priority Data
Apr. 2, 2012 (DE) .......... 10 2012 006 541

(51) Int. Cl.
*B01J 29/74* (2006.01)
*B01J 35/10* (2006.01)
*G21C 9/06* (2006.01)

(52) U.S. Cl.
CPC ....... *B01J 29/7415* (2013.01); *B01J 35/1004* (2013.01); *B01J 35/1047* (2013.01); *G21C 9/06* (2013.01)

(58) Field of Classification Search
None
See application file for complete search history.

(56) References Cited

U.S. PATENT DOCUMENTS

2002/0111522 A1 * 8/2002 Overbeek .............. B01J 29/06
585/467

FOREIGN PATENT DOCUMENTS

EP 0466396 A1 * 1/1992 ............ B01J 29/035

* cited by examiner

*Primary Examiner* — Colin W. Slifka

(57) ABSTRACT

A hydrogen oxidation catalyst is provided, comprising a zeolite that contains at least one catalytically active noble metal or a compound thereof, wherein said zeolite is a hydrophobic zeolite. A use of the catalyst and a method for hydrogen recombination in nuclear power plants, reprocessing plants or fuel element repositories is also specified.

6 Claims, 2 Drawing Sheets

HYDROGEN OXIDATION CATALYST, USE THEREOF, AND METHOD FOR HYDROGEN RECOMBINATION

The present invention relates to a hydrogen oxidation catalyst, a use of this and a process for hydrogen recombination.

In nuclear power stations, all components which come into contact with radioactive materials are collected together in the "nuclear island". This comprises the safety vessel (inner containment) with primary circuit, the overflow basin and the core catcher. In the upper part of the safety vessel, catalytic recombiners or recombiner systems can be installed with the aim of limiting the proportion of hydrogen going into the atmosphere in order to prevent hydrogen explosions.

In nuclear power stations, in particular in pressurized reactors and boiling water reactors, but also in the cooling tanks and all other regions where water comes into contact with nuclear fuel rods, significant amounts of hydrogen and oxygen can be formed by radiolysis of water at the surface of hot fuel rods. At other contact areas between hot metal and water (vapor), too, decomposition of water into hydrogen and oxygen is possible, particularly in the components of the primary circuit. If hydrogen accumulates in the buildings of the nuclear island, explosive atmospheres can occur and in the event of an explosion can lead to the destruction of reactor pressure vessel and other regions of the primary circuit, in the case of which liberation of large amounts of radioactive material has to be expected. An example of such an event to be classified as greatest accident is the nuclear catastrophe at Fukushima.

To avoid such catastrophes, nuclear power stations have more recently been equipped or retrofitted with recombiner systems. These are passive systems whose task is to reoxidize hydrogen formed at room temperature under atmospheric conditions catalytically to water vapor and thus avoid the formation of explosive atmospheres. This process has to start up and proceed automatically without active auxiliary elements such as heating devices, blowers, etc., particularly also in the event of the emergency power supply failing, and carry on without external assistance. The starting of the reaction has to occur safely for fresh catalyst material, for example catalyst material which has been stored or exposed to operating states prevailing in the safety vessel. Recombiners which ensure that the hydrogen liberated can react to form water before an explosive concentration arises can also be used for cooling tanks and fuel element containers. That is to say, this catalyst is suitable both for active and shut-down nuclear power stations, reprocessing plants and fuel element stores.

For this purpose, an $Al_2O_3$ bed catalyst which is doped with 0.4-0.5% by weight of Pd and is hydrophobicized in a complicated process using organosilicon compounds to allow recombination catalysis to proceed even at high water vapor concentrations as inevitably occur in the case of a malfunction with a temperature rise, is known. This method of production is expensive and has serious technical problems in the production process. The hydrophobicized layer also decomposes above about 180° C. This is unsatisfactory because, in normal operation, organic substances can deposit on the catalyst from the atmosphere of the safety vessel and these would reduce the effectiveness of the catalyst by blocking the surface. Regeneration of the catalyst by burning-off of the organic substances without destruction of the hydrophobicizing layer is not possible. For this reason, only the replacement of the catalyst in the context of refitting, combined with high costs for procurement of fresh catalyst and disposal of the old catalyst, remains in the picture. Furthermore, decomposition of the hydrophobicizing layer due to the thermal energy released can give the sparks which can lead to an explosion.

Furthermore, recombiner catalysts based on metal sheets having purely inorganic coatings (for example Pd on $Al_2O_3$) which are installed hanging next to one another are known. This reduces the pressure drop and the gas velocity in the recombiner. This is important because start-up has to occur passively by means of autoconvection. In addition, the metal sheets can be regenerated by burning-off during refitting. However, it is a disadvantage that, owing to the hydrophilicity of the $Al_2O_3$, relatively large amounts of noble metal are required in order to counter the inhibiting and deactivating effect of a high water loading and to ensure the ability of the recombiner catalyst to function.

It is therefore an object of the invention to provide a catalyst which can be used in recombiner systems even at high water vapor contents, has good regenerability and is also characterized by a lower level of noble metal doping at the same effectiveness.

This object is achieved by a hydrogen oxidation catalyst as claimed in claim 1, a use of this as claimed in 12 and a process for hydrogen recombination in nuclear power stations, reprocessing plants or fuel element stores as claimed in claim 14.

In one embodiment, a hydrogen oxidation catalyst comprising a zeolite which contains at least one catalytically active noble metal or a compound thereof where the zeolite is a hydrophobic zeolite, is provided.

Another embodiment relates to the use of a hydrogen oxidation catalyst comprising a zeolite which contains at least one catalytically active noble metal or a compound thereof, where the zeolite is a hydrophobic zeolite, as oxidation catalyst and/or for hydrogen recombination in nuclear power stations, reprocessing plants or fuel element stores.

In a further embodiment, hydrogen and oxygen are brought into contact with a hydrogen oxidation catalyst comprising a zeolite which contains at least one catalytically active noble metal or a compound thereof, where the zeolite is a hydrophobic zeolite, in a process for hydrogen recombination in nuclear power stations, reprocessing plants or fuel element stores.

The embodiments according to the invention of the hydrogen oxidation catalyst surprisingly make it possible for the catalyst to have excellent activity in the oxidation of hydrogen and in addition excellent regenerability even at low noble metal concentrations. This effect is observed, for example, when the noble metal-doped or undoped zeolite used in the production process is hydrophobic per se, i.e. when it has a high "intrinsic" hydrophobicity which, in some examples, is retained even at high temperatures up to destruction of the zeolite structure above 1000° C. The catalyst can be used both as loose material or applied to honeycombs or metal sheets. This makes it possible to provide a hydrogen oxidation or recombination catalyst which has an advantageous procurement price because of the low noble metal loading.

Further features and useful aspects can be derived from the following description of embodiments, the figures and the dependent claims.

Figure 1:
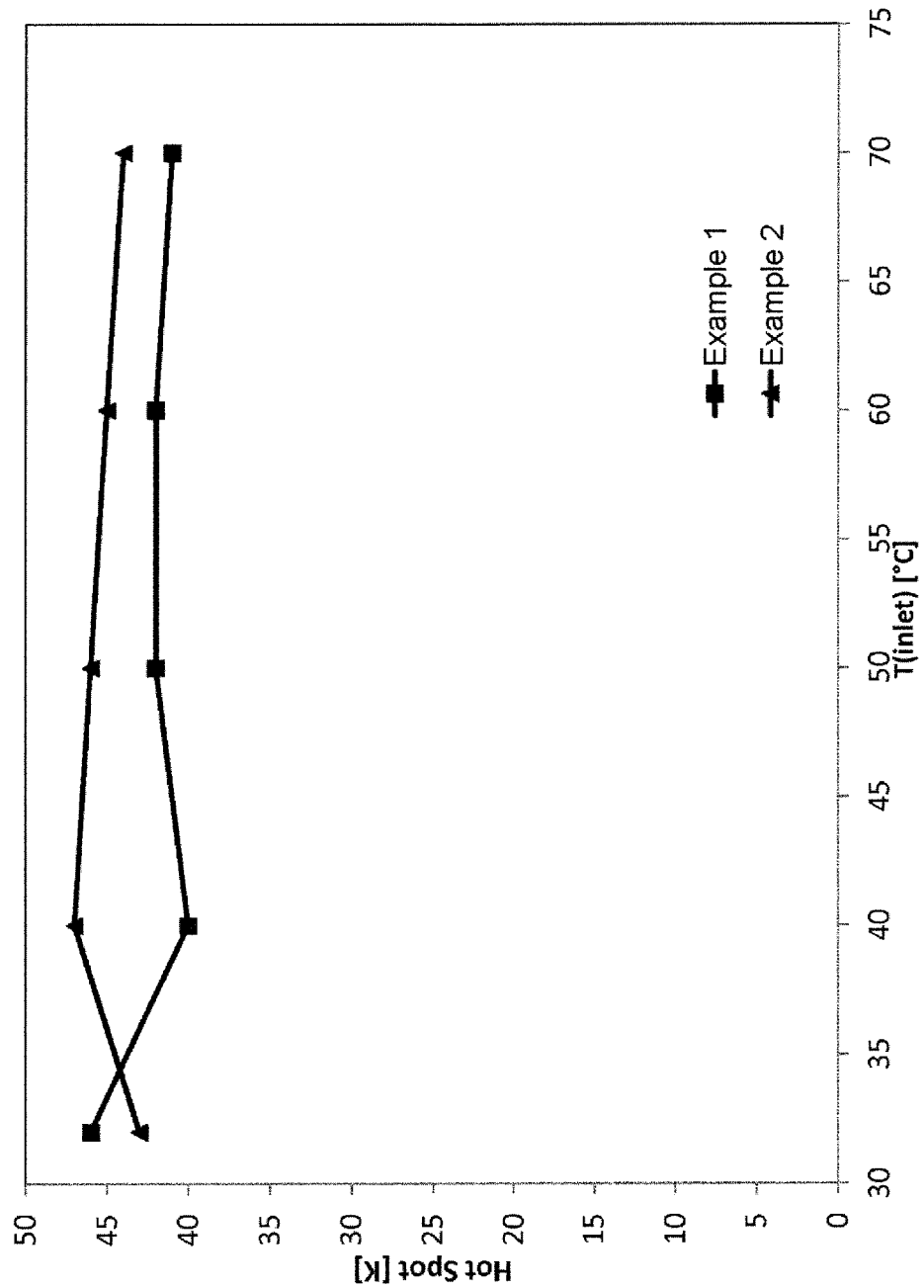
FIG. 1 is a graph showing the ignition behavior of Examples 1 and 2 in the hydrogen ignition test.
Figure 2:
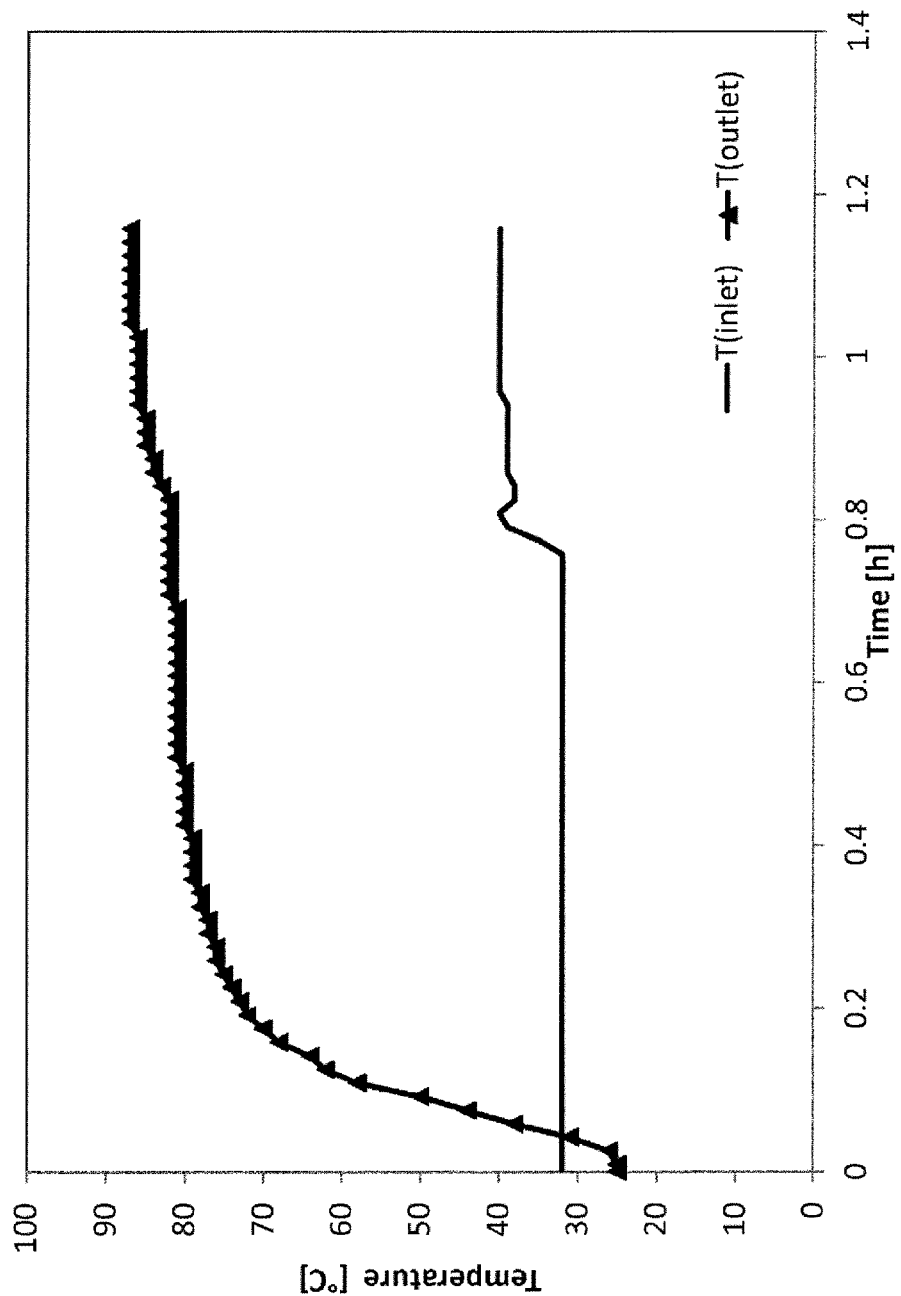
FIG. 2 is a graph showing the ignition behavior of the comparative example in the hydrogen ignition test.

All features of embodiments which are described here and are not mutually exclusive can be combined with one another. Elements of one embodiment can be utilized in the other embodiments without further mention. Embodiments of the invention will now be described in more detail by the following examples with the aid of figures, without wishing to restrict them thereby. The figures show:

FIG. 1 the ignition behavior of the examples in the hydrogen ignition test (0.67% of $H_2$ and 0.1% of $H_2O$ in air); and FIG. 2 the ignition behavior of the comparative example in the hydrogen ignition test (0.67% of $H_2$ and 0.1% of $H_2O$ in air).

In the following description of embodiments, the terms hydrogen oxidation and hydrogen recombination can be used synonymously. Furthermore, the hydrogen oxidation catalyst is also referred to simply as catalyst. In addition, the terms zeolite and zeolite material are used synonymously in the following description.

Furthermore, the embodiments of the invention are described below on the basis of a hydrophobic zeolite containing platinum or platinum and palladium, without the invention being restricted to these noble metals.

In embodiments, the term "comprising" encompasses "consisting essentially of" or "consisting of" and can be replaced by these. This applies analogously to grammatical modifications of the word "comprising". Furthermore, in the case of the description of value ranges here, the reporting of a broad range with narrower alternative or preferred ranges should also be interpreted as disclosing ranges which can be formed by any combination of lower range limits indicated with upper range limits indicated.

In one embodiment, a hydrogen oxidation catalyst comprising a zeolite which contains at least one catalytically active noble metal or a compound thereof, where the zeolite is a hydrophobic zeolite, is provided. Hydrophobic zeolites can have a high proportion of $SiO_2$ which, for example, exceeds 94% by weight and preferably 98% by weight. The term "a catalytically active noble metal or a compound thereof" can, for the purposes of the invention, also be taken to mean a precursor of the catalytically active noble metal or a compound of a precursor of the catalytically active noble metal or encompass such a precursor/compound of a precursor.

The embodiments of the catalyst according to the invention surprisingly make it possible to achieve excellent activity in the oxidation of hydrogen and also an excellent regenerability even at low noble metal concentrations. The hydrophobic properties of the zeolite used in embodiments, with, for example, a proportion of $SiO_2$ of >98%, result in the noble metal-containing zeolite and thus also the catalyst of embodiments being hydrophobic. As a result both the fresh catalyst or the catalyst which has been stored or used for a relatively long period of time is ready to use without further measures. Thus, the oxidation of hydrogen is introduced and catalyzed automatically and also maintained over a prolonged period by the catalyst without excessive delay.

The noble metal-doped zeolite can, in embodiments of the invention, be used either as loose material or applied to honeycombs or metal sheets. As a result of this and because of its low noble metal concentration, it is possible to provide a hydrogen oxidation or recombination catalyst which, owing to the low noble metal loading, has an advantageous procurement price.

Furthermore, owing to the hydrophobic properties of the zeolite used in embodiments, no external coating, e.g. with organosilicon compounds, or other measures are required in order to make the noble metal-loaded zeolite or the catalyst hydrophobic. This makes regeneration of the catalyst by burning-off of (organic) materials deposited on the catalyst possible. The hydrophobic properties of the zeolites are, in embodiments of the invention, not impaired by the burning-off. In addition, the amount of the decomposition products produced by the burning-off is significantly reduced compared to catalysts which have hydrophobic coatings.

For the purposes of the present invention, a zeolite or a zeolite material is, according to a definition of the International Mineralogical Association (D. S. Coombs et al., Can. Mineralogist, 35, 1997, 1571), a crystalline substance having a structure characterized by a framework made up of interconnected tetrahedra. Here, each tetrahedron consists of four oxygen atoms surrounding a central atom, with the framework containing open hollow spaces in the form of channels and cages which are normally occupied by water molecules and extraframework cations which can be exchanged. The channels of the material are large enough to allow access for guest compounds. In the case of hydrated materials, dehydration usually occurs at temperatures below about 400° C. and is largely reversible.

The zeolite material which can be used in embodiments can, for example, be a silicate, an aluminum silicate, a silicon-aluminum phosphate, a metal-aluminum phosphosilicate, a gallium-aluminum silicate, a boroaluminum silicate or a titanosilicon-aluminum phosphate (TAPSO), with aluminum silicates, also referred to as aluminum silicate zeolites, being particularly preferred.

The term "aluminum silicate" refers, according to the definition of the International Mineralogical Association (D. S. Coombs et al., Can. Mineralogist, 35, 1997, 1571), to a crystalline substance having a three-dimensional framework structure of the general formula $M^{n+}[(AlO_2)_x(SiO_2)_y]xH_2O$ which is made up of $SiO_{4/2}$ and $AlO_{4/2}$ tetrahedra which are linked by shared oxygen atoms to form a regular three-dimensional network. The atom ratio of $Si/Al=y/x$ is always greater than or equal to 1 in accordance with the "Löwenstein Rule" which prohibits the occurrence of two adjacent negatively charged $AlO_{4/2}$ tetrahedra. The $SiO_2/Al_2O_3$ ratio in an aluminum silicate zeolite is also referred to as modulus.

The zeolite used in the catalyst of embodiments is preferably an intrinsically hydrophobic zeolite, i.e. the zeolite which is not loaded with noble metals is hydrophobic. In the selection of a suitable doping process known from the prior art, this leads to the zeolite containing the noble metal and thus also the catalyst of embodiments also to be hydrophobic without further auxiliaries or measures. Treatment of the zeolite used is superfluous to bringing about or increasing the hydrophobic properties of said zeolite.

In further embodiments of the catalyst, the zeolite is an aluminum silicate and/or has a proportion of $SiO_2$ of >94% by weight, preferably >98% by weight. Preference is given to embodiments in which aluminum silicate zeolites having an approximate proportion of $SiO_2$ of >94% by weight, preferably >98% by weight, are used. The approximate proportions of $SiO_2$ as a function of the modulus $SiO_2/Al_2O_3$:

| SiO$_2$/Al$_2$O$_3$ | % by weight of SiO$_2$ |
|---|---|
| 10 | 85 |
| 20 | 92 |
| 30 | 94 |
| 50 | 97 |
| 100 | 98 |
| 150 | 99 |

In embodiments of the invention, the zeolite used has an SiO$_2$/Al$_2$O$_3$ ratio of preferably >30, more preferably >50, in particular >100. It has surprisingly been found that only such a high SiO$_2$/Al$_2$O$_3$ ratio brings about sufficiently hydrophobic properties of the zeolite which is not loaded with noble metal and/or noble metal-loaded zeolite, as also the entire catalyst. In some embodiments, the SiO$_2$/Al$_2$O$_3$ ratio of the zeolite used is in the range >100 or >140, e.g. in the range from 100 to 250 or from 130 to 170.

If, according to one embodiment, the catalyst is produced as honeycomb or shaped body which is coated with a washcoat containing the noble metal-containing zeolite, the zeolite can contain from 0.1 to 10% by weight, preferably from 0.5 to 8% by weight, more preferably from 1 to 5% by weight, of noble metal. In the finished catalyst configured as honeycomb or shaped body, the noble metal content can be from 0.01 to 5 g/l, preferably from 0.1 to 3 g/l and particularly preferably from 0.3 to 1.0 g/l. If, according to a further embodiment, the catalyst is produced as loose material or loose or pourable extrudate, the noble metal content can be from 0.01 to 0.5% by weight, preferably from 0.02 to 0.4% by weight and particularly preferably 0.03-0.3% by weight, based on the noble metal-containing zeolite. The catalyst of embodiments surprisingly has excellent activity in the oxidation of hydrogen even at such a low noble metal loading.

The zeolite material used in embodiments can preferably correspond to one of the following structure types: ABW, ACO, AEI, AEL, AEN, AET, AFG, AFT, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, CDO, CFI, CGF, CGS, CHA, CHI, CLO, CON, CZP, DAC, DDR, DFO, DFT, DOH, DON, EAB, EDI, EMT, EON, EPI, ERI, ESV, ETR, EUO, EZT, FAR, FAU, FER, FRA, GIS, GIU, GME, GON, GOO, HEU, IFR, IHW, ISV, ITE, ITH, ITW, IWR, IWV, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SIV, SOD, SOS, SSY, STF, STI, STT, SZR, TER, THO, TON, TSC, TUN, UEI, UFI, UOZ, USI, UTL, VET, VFI, VNI, VSV, WEI, WEN, YUG and ZON, with zeolite materials having a 12-membered ring pore system (BEA, FAU) being preferred and those of the structure type beta (BEA) being particularly preferred. The above three-letter code nomenclature corresponds to that of the "IUPAC Commission of Zeolite Nomenclature". In addition, according to embodiments of the invention, the zeolite can be selected from the group consisting of AFT, AEL, BEA, CHA, EUO, FAU, FER, KFI, LTL, MAZ, MOR, MEL, MTW, OFF, TON and MFI. The zeolite structure types mentioned are suitable for the purposes of the invention since they allow the desired hydrophobic properties and/or the desired activity to be realized particularly advantageously at a low noble metal loading of the catalyst.

In embodiments, the noble metal can be selected from the group consisting of rhodium, iridium, palladium, platinum, ruthenium, osmium, gold and silver and combinations of the noble metals mentioned. In embodiments of the invention, these noble metals display a particularly desired activity in the catalysis of the oxidation of hydrogen.

The BET surface area of the catalyst of examples can be from 10 to 1000 m$^2$/g, preferably from 300 to 900 m$^2$/g, particularly preferably from 500 to 700 m$^2$/g, and/or the integrated pore volume of the catalyst can be greater than 100 mm$^3$/g, preferably greater than 200 mm$^3$/g. The catalytic activity of the hydrogen oxidation catalyst can be favorably influenced by these properties, either individually or in combination.

In a preferred embodiment of the hydrogen oxidation catalyst, the noble metal can be located essentially in the pores of the zeolite. This likewise promotes the oxidation of hydrogen since the catalyzing noble metal present in highly disperse form in the pores of the zeolite comes into contact with the hydrogen particularly easily. Furthermore, agglomeration of the noble metal particles at high temperatures, which would lead to a loss of catalytically active surface and thus of performance, is significantly slowed or prevented thereby. The catalyst thus remains effective in the case of large amounts of hydrogen to be oxidized.

The noble metal or the noble metals can, for example, be introduced into the zeolite by ion exchange or by impregnation. The noble metals can be present in the zeolite either in the form of noble metal particles or in the form of noble metal oxide particles or mixed phases of metal and metal oxide. Furthermore, the noble metal particles are preferably XRD-amorphous and thus have an average diameter of less than 5 nm.

In embodiments of the catalyst of the invention, preference is given to the catalyst being present as all-active catalyst or as coated catalyst. An all-active catalyst can, for example, be an extruded shaped body, for example a monolith.

In some embodiments, the catalyst can be configured as solid extrudate or as shaped body. In further embodiments, the catalyst can comprise a support onto which the zeolite or a zeolite-containing washcoat has been applied. Furthermore, the catalyst and/or the support can have a honeycomb-like or plate-like configuration. In these cases, the content of noble metal can be from 0.01 to 5 g/l, in particular based on the catalyst volume.

The catalyst of the examples can be configured as loose material. The catalyst can also, for example, be configured as extrudate, as shaped bodies or as particles coated with the zeolite. In embodiments, the catalyst can have been extruded to form a pourable material or shaped bodies. For example, the loose material can consist of shaped bodies or pellets which have been produced by pressing or extrusion of a suspension of the zeolite loaded with noble metal. In these cases, the content of noble metal can be from 0.01 to 0.5% by weight, based on the noble metal-containing zeolite.

Illustrative geometric shapes of the catalyst or the shaped body are spheres, rings, cylinders, cylinders with a hole, trilobes or cones, with particular preference being given to a monolith, for example a monolithic honeycomb body.

Furthermore, the catalyst can, as mentioned above, comprise a support onto which the zeolite or a zeolite-containing washcoat has been applied. As washcoat, use is made of, for example, a suspension or a slurry of the zeolite in a suspension medium, e.g. in water, optionally with addition of a preferably siliceous binder. The zeolite can, for example, be applied to the support by coating with a suspension or with the washcoat or by growing onto the support from a solution.

The catalyst and/or the support can, as mentioned above, have a honeycomb-like or plate-like configuration, e.g. as metal sheets. The plate-like variant allows parallel installation of a plurality of hydrogen oxidation catalysts in the upper region of the safety vessel of nuclear power stations, as a result of which good flow of the hydrogen gas through the catalysts can be achieved.

In combination with a washcoat, preference is also given to the catalyst, if it is configured as a catalyst honeycomb, having a noble metal loading of from 0.01 to 5.0 g/l, more preferably from 0.1 to 3.0 g/l and most preferably from 0.3 to 1.0 g/l, based on the volume of the honeycomb body.

In embodiments, the support can comprise a metal oxide, preferably a titanium oxide, a cerium oxide, an aluminum oxide, a tin oxide, a zirconium oxide, a silicon oxide, a zinc oxide, an aluminum oxide-silicon oxide or a magnesium silicate or a mixture of two or more of the abovementioned oxides as support material. It is possible to use supports or support bodies composed of ceramic material. The ceramic material is frequently an inert low-surface-area material such as cordierite, mullite, alpha-aluminum oxide, silicon carbide or aluminum titanate. However, the support body used can also consist of high-surface-area material such as gamma-aluminum oxide or $TiO_2$. Metals can also be used as support material. For this reason, preferred supports or support bodies likewise include, for example, supports or support bodies made of a metal sheet, of any metal or of a metal alloy which comprise a metal foil or sintered metal foil or a metal mesh and are produced, for example, by extrusion, rolling-up or stacking.

Furthermore, it can be advantageous in the case of metallic supports to precalcine the support, preferably at 500-900° C., and/or provide it with an oxidic bonding layer by means of suitable physical, chemical and/or electrochemical methods known from the prior art, e.g. pickling with acids, coating with metal oxides such as $Al_2O_3$, $SiO_2$, $TiO_2$ and mixtures thereof.

In particular, the catalyst of embodiments can be used as oxidation catalyst and/or for hydrogen recombination in nuclear power stations, reprocessing plants or fuel element stores, e.g. in safety vessels or cooling tanks of nuclear power stations or in containers for unirradiated, irradiated or burnt-out fuel elements, generally in all gas spaces above regions where nuclear fuel has to be cooled by means of water. Here, the catalyst of embodiments can be used in systems in which hot surfaces, e.g. metal surfaces, come into contact with water.

The invention also provides a process for hydrogen recombination in nuclear power stations, reprocessing plants or fuel element stores, in which hydrogen and oxygen are brought into contact with a catalyst as per one of the above embodiments. The abovementioned advantages are achieved in this case.

The catalyst of examples can be produced by processes in which the noble metal is introduced into a zeolite material. As mentioned above, an intrinsically hydrophobic zeolite as described above can be used as zeolite material.

An example of a process for producing the catalyst comprises: a) introduction of a noble metal compound, also referred to as metal compound, into a zeolite material; b) wet milling of the zeolite material loaded with metal compound together with a porous support material; c) calcination of the mixture comprising the loaded zeolite material and the support material; and d) conversion of the metal of the metal compound with which the zeolite material is loaded into its metallic form, which can consist of metal particles. Here, a fixing step can be carried out after step a) and before step b), which comprises calcination of the zeolite material loaded with metal compound, in which the metal of the metal compound is fixed to the zeolite material. The fixing step can comprise conversion of the metal of the metal compound into its metallic or oxidic form or into metallic-oxidic mixed phases. Furthermore, a stablizing step to stabilize the supported metal catalyst can be carried out. The calcination can, for example, be carried out at a temperature of from 200 to 800° C. In this way, it is possible to obtain a supported metal catalyst comprising a porous support material and a zeolite material whose internal surface area is loaded with metal particles.

For the purposes of the present invention, "supported catalysts", also referred to as coated catalysts, are solid-state catalysts produced by coating a support body with a typically porous layer containing the actual catalytically active species.

The introduction of the noble metal compound, here also referred to as metal compound, into the zeolite material or into the zeolite can be carried out by means of solid-state inward exchange or solid-state ion exchange to give embodiments of the invention. For example, the introduction is effected by mixing of the zeolite material with the metal compound in the dry state in a ball mill with subsequent heat treatment at elevated temperatures, preferably at a temperature of from 450 to 650° C. As an alternative, the introduction of the metal compound is effected by impregnating the zeolite material with a solution of the metal compound, for example by spraying the solution onto the zeolite material. The impregnation can also be carried out in a chamber in which turbulent flow brought about by suction being applied to the chamber and also a subatmospheric pressure prevails. In another process for producing an embodiment, the introduction of the metal compound is effected by impregnating the zeolite material with a solution of the metal compound by means of the pore-filling method. Here, the zeolite material is brought into contact with an amount of solution whose volume corresponds to the pore volume of the zeolite material used.

As noble metal compounds, it is possible to use the appropriate nitrates, acetates, oxalates, tartrates, formates, amines, sulfites, carbonates, halides or hydroxides in the process for producing the catalyst.

In embodiments, the zeolite material used for producing the catalyst can also be a microporous or mesoporous zeolite material, for example of the structure type beta or from the MCM family.

The catalyst according to embodiments can, for example, comprise a microporous noble metal-containing zeolite material and a porous, preferably $SiO_2$-containing, binder, with the catalyst being able to have a proportion of micropores, e.g. having a diameter of <1 nm, of more than 70%, based on the total pore volume of the catalyst. Furthermore, the zeolite material can have a proportion of aluminum of less than 2 mol %. The weight ratio of zeolite material/binder can be from 99:1 to 50:50. As $SiO_2$-containing binder, it is possible to use a pure $SiO_2$ binder, e.g. Bindzil 2034 DI suspension (Eka-Chemicals AB, Bohus/Sweden).

Such a catalyst of embodiments can be produced by a) introduction of a noble metal precursor compound into a microporous zeolite material; b) calcination of the zeolite material loaded with the noble metal precursor compound; c) mixing of the resulting noble metal-loaded zeolite material with a porous $SiO_2$-containing binder and a solvent; and d) drying and calcination of the mixture comprising the zeolite material loaded with the noble metal compound and the binder. Here, the mixture obtained in step c) can be applied or extruded onto a support, also referred to as support body. Furthermore, conversion of the metal of the noble metal compound with which the zeolite material is loaded into its metallic form can be carried out. The conversion of the noble metal compound into the corresponding noble metal is usually effected by thermal decomposition, e.g. during one of the calcination steps, or by reduction, e.g. by means of hydrogen.

In a further process for producing the catalyst of the embodiments, a bimetallic catalyst is produced. This example will be described for the production of a Pt- and Pd-containing catalyst which can be obtained by: impregnation of a zeolitic support material with sulfur-free Pt and Pd precursor compounds, drying of the impregnated zeolitic support material in air, and calcination of the impregnated and dried zeolitic support material in air. As Pt and Pd precursor compounds, it is possible to use solutions of the nitrates. In addition, calcination can be carried out at temperatures of from 350 to 650° C. In particular, drying of the impregnated zeolitic support material can be carried out below the decomposition point of the Pt and Pd precursor compounds. In this process, the following steps can also be present: production of a washcoat from the impregnated and calcined zeolitic support material, coating of a support body with the washcoat, drying and calcination of the coated support body in air. Calcination is preferably carried out at temperatures of from 300 to 600° C., more preferably from 400 to 550° C. The calcination time is preferably from 1 to 8 hours, more preferably from 2 to 6 hours and in particular from about 3 to 5 hours.

In this way, it is possible to produce a catalyst according to embodiments which contains a bimetallic catalytically active composition containing Pt and Pd on a zeolitic support material. The bimetallic catalytically active composition can have a BET surface area of more than 400 m$^2$/g.

If, as per one embodiment, the catalytically active composition is applied as washcoat to a honeycomb or another shaped body, the bimetallic catalytically active composition can contain from 0.1 to 10% by weight, preferably from 0.5 to 8% by weight, more preferably from 1 to 5% by weight, of noble metal based on the noble metal-containing zeolite. If, according to a further embodiment, the catalyst is produced as a loose material or pourable extrudate the noble metal content of the bimetallic catalytic composition is from 0.01 to 0.5% by weight, preferably from 0.02 to 0.4% by weight and particularly preferably 0.03-0.3% by weight, once again based on the noble metal-containing zeolite. In both the abovementioned embodiments, the bimetallic catalytically active composition can have a Pd/Pt weight ratio of from 6:1 to 1:1. In the catalyst of this example, Pt and Pd can be present essentially in the pores of the zeolite support material and in aggregates of <5 nm.

Measurement Methods

Elemental Analysis Using ICP:

The ICP-AES (inductively coupled plasma atomic emission spectroscopy) for determining the elemental composition and the SiO$_2$/Al$_2$O$_3$ ratio was carried out using the ICP Spectro Modula/Arcos instrument. As chemicals, the following were used: sulfuric acid 98% AR, hydrofluoric acid 37% AR, hydrochloric acid 37% AR. The sample was finely milled.

For Si and Al, 100 mg of sample were weighed into a 100 ml plastic beaker and admixed with 1 ml of sulfuric acid and 4 ml of hydrofluoric acid. The sample was digested at 85° C. for 5 minutes on a waterbath until a clear solution was formed. The mixture was cooled, made up to the mark and shaken. All elements were measured on the ICP, and likewise corresponding standards. Si was measured using the following settings: wavelength: 288, 158 nm. Al was measured using the following settings: wavelength: 396, 152 nm.

For Pt and/or Pd, the amount of sample weighed out was such that about 3 mg of Pt or Pd were present therein. 6 ml of hydrofluoric acid and 6 ml of hydrochloric acid were subsequently added. The mixture was then heated at 180° C. for 30 minutes while stirring in order to produce a clear solution. The mixture was cooled, made up to the mark and shaken. All elements were measured on the ICP, and likewise corresponding standards. Pt was measured using the following settings: wavelength: 214, 423 nm. For Pd, the wavelengths were: 324, 270 nm.

All standards were matched using HF and HCl or H$_2$SO$_4$. The evaluation was carried out by the following calculation: w(E* in percent)=β(E* measured value in mg/1)×V(volumetric flask in 1)×100/m(sample weight in mg) (E*=respective element.

BET Surface Area:

The determination is carried out by the BET method in accordance with DIN 66131; the BET method is also published in J. Am. Chem. Soc. 60, 309 (1938). The sample to be measured was dried in a U-shaped fused silica reactor at 200° C. under an Ar atmosphere (F=50 ml (min) for 1.5 h). The reactor was then cooled to room temperature, evacuated and dipped into a Dewar vessel containing liquid nitrogen. The nitrogen adsorption was carried out at 77 K using an RXM 100 sorption system (Advanced Scientific Design, Inc.).

Pore Volume and Pore Size:

The integrated pore volume was determined in accordance with DIN 66134, a determination of the pore size distribution and the specific surface area of mesoporous solids by nitrogen sorption by the BJH method (method of Barrett, Joyner and Halenda).

EXAMPLE 1

1. Production of the Noble Metal-containing Zeolite Powder Pt-BEA-150

H-BEA-150 powder (SiO$_2$/Al$_2$O$_3$=150) was impregnated with Pt(NO$_3$)$_2$ solution diluted with water in a mixer from Netzsch having a butterfly stirrer and subsequently dried at 120° C. for 6 hours. The Pt-zeolite was then calcined at 550° C./5 h (heating rate 60 K/h) under argon (flow rate 50 l/h). The Pt content of the Pt-BEA-150 powder was 1.8% by weight.

2. Production of the Washcoat and Honeycomb Coating 650 g of the Pt-BEA-150 powder produced as described above were dispersed together with 432 g of Bindzil 2034 DI suspension (Eka-Chemicals AB, Bohus/Sweden) using an Ultra-Turrax stirrer for about 10 minutes until no more sediment was present to produce a suspension in 950 g of water. A 200 cpsi cordierite support was subsequently dipped into the suspension for 30 s. After taking up, the support coated with 30.2 g of washcoat was blown out with compressed air and dried overnight at 150° C. The support was finally calcined at 550° C. in a convection furnace for 3 hours.

EXAMPLE 2

1. Production of the Noble Metal-containing Zeolite Powder PtPd-BEA-150

H-BEA-150 powder ($SiO_2/Al_2O_3=150$) was impregnated with a solution of $Pt(NO_3)_2$ and $Pd(NO_3)_2$ diluted with water in a mixer from Netzsch having a butterfly stirrer and subsequently dried at 90° C. for 6 hours. The Pt-zeolite was then calcined at 550° C./5 h (heating rate 60 K/h) in air. The Pt content of the Pt-BEA-150 powder was 0.8% by weight, and the Pd content was 2.3% by weight.

2. Production of the Washcoat and Honeycomb Coating 650 g of the Pt-Pd-BEA-150 powder produced as described above were dispersed together with 432 g of Bindzil 2034 DI suspension (Eka-Chemicals AB, Bohus/Sweden) using an Ultra-Turrax stirrer for about 10 minutes until no more sediment was present to produce a suspension in 950 g of water. A 200 cpsi cordierite support was subsequently dipped into the suspension for 30 s. After taking up, the support coated with 27.1 g of washcoat was blown out with compressed air and dried overnight at 150° C. The support was finally calcined at 550° C. in a convection furnace for 3 hours.

COMPARATIVE EXAMPLE

As comparative example, a Pd-doped $Al_2O_3$ catalyst, namely E2051 PGB from Süd-Chemie AG, was used. This is a loose material catalyst having a particle diameter of 4-6 mm and a Pd doping of 0.4-0.5% by weight which has hydrophobic properties as a result of an applied layer of triethoxypropylsilane. The applied layer of triethoxypropylsilane is thermally decomposable above 180° C.

TABLE 1

Catalytic test conditions (hydrogen ignition test using 0.67% of $H_2$ and 0.1% of $H_2O$ in air)

|  | Example 1 | Example 2 | Comparative Example |
|---|---|---|---|
| Catalyst form | 200 cpsi honeycomb | 200 cpsi honeycomb | loose material with 4-6 mm particle diameter |
| Catalyst volume [ml] | 39.8 | 39.8 | 200 |
| Noble metal density | 0.42 g/l of Pt | 0.17 g/l of Pt and 0.49 g/l of Pd | 2.88 g/l of Pd |
| Total flow of test gas [l/h] | 920 | 920 | 1500 |
| GHSV [$h^{-1}$] | 25 000 | 25 000 | 7500 |
| Linear velocity of the test gas [m/s] | 0.64 | 0.64 | 2.61 |

The catalytic activity of the catalysts produced was examined in a fixed-bed reactor lined with a fused silica tube. As equivalent to the conversion, the temperature difference between catalyst inlet and catalyst outlet was measured by means of temperature sensors. When the difference between catalyst inlet and catalyst outlet is <5 K, the reaction to be catalyzed, namely the oxidation of hydrogen, is considered to be "not ignited". In the case of a difference of >40 K, the oxidation of hydrogen is considered to be "ignited through", i.e. started and proceeding independently.

FIG. 1 shows the ignition behavior of Examples 1 and 2 in the hydrogen ignition test (0.67% of $H_2$ and 0.1% of $H_2O$ in air), with the difference between catalyst outlet and catalyst inlet, i.e. in the present example the "hot spot", being plotted against the temperature of the catalyst inlet. FIG. 2 shows the ignition behavior of the comparative example in the hydrogen ignition test (0.67% of $H_2$ and 0.1% of $H_2O$ in air), with the temperatures of the catalyst inlet (lower curve) and catalyst outlet (upper curve) being plotted against the time from commencement of the test.

In FIGS. 1 and 2, it can be seen that not only the two Examples 1 and 2 but also the comparative example ignite through at an entry temperature of 32° C., although only 14% and 23% of the amount of noble metal of the comparative example were used in Examples 1 and 2, respectively. This means that the catalyst according to embodiments has excellent activity in the oxidation of hydrogen even at low noble metal concentrations and thus leads to a significant cost saving.

The noble metal-doped BEA-150 zeolites used in Examples 1 and 2 and the corresponding catalysts also have a high thermal stability, as the high calcination temperatures (550° C.), for example, indicate. This applies particularly in comparison with the comparative example which is provided with hydrophobic properties by application of an organosilicon layer which can be thermally decomposed at as low as 180° C. For this reason, regeneration of the recombiner systems by burning off organic deposits is possible when using the catalyst according to embodiments. This too, is a significant advantage compared to the catalyst of the comparative example in which the layer of an organosilicon compound is decomposed during burning-off and the hydrophobic properties of the catalyst are thus reduced or even disappear.

The invention claimed is:

1. A process for hydrogen combination in nuclear power stations, reprocessing plants, or fuel element stores, comprising:
    providing a nuclear power station, a nuclear fuel reprocessing plant or a nuclear fuel element store, in which hydrogen is generated by the contact of nuclear fuel with water, or by the contact of hot metal with water; and
    contacting the hydrogen generated in the nuclear power station, the nuclear fuel reprocessing plant or the nuclear fuel element store and oxygen with a catalyst to form water, wherein the catalyst comprises an intrinsically hydrophobic BEA zeolite having a $SiO_2/Al_2O_3$ ratio greater than 100, the BEA zeolite not being hydrophobicized with an organosilicon compound, the BEA zeolite containing a catalytically-active noble metal.

2. A process of claim 1, further comprising, after contacting the hydrogen with the catalyst, regenerating the catalyst by burning off organic deposits by heating.

3. A process of claim 1, wherein the noble metal is selected from the group consisting of rhodium, iridium, palladium, platinum, ruthenium, osmium, gold, silver and combinations thereof.

4. A process of claim 1, wherein the BET surface area of the catalyst is from 300 to 900 $m^2/g$, and the integral pore volume of the catalyst is greater than 100 $mm^3/g$.

5. A process of claim 1, wherein the noble metal is disposed essentially in pores of the BEA zeolite.

6. A process of claim 1, wherein the noble metal is platinum, palladium, or a combination thereof.

* * * * *